US012678976B2

(12) United States Patent
Sinha et al.

(10) Patent No.: US 12,678,976 B2
(45) Date of Patent: Jul. 14, 2026

(54) ROBOTIC APPARATUS FOR CERAMIC MATRIX COMPOSITES

(71) Applicant: General Electric Company, Schenectady, NY (US)

(72) Inventors: Shatil Sinha, Clifton Park, NY (US); Younkoo Jeong, Clifton Park, NY (US); Chen Zhang, Albany, NY (US); Matthew Hockemeyer, Ballston Spa, NY (US); Anirban Sinha, Schenectady, NY (US)

(73) Assignee: General Electric Company, Evendale, OH (US)

( * ) Notice: Subject to any disclaimer, the term of this patent is extended or adjusted under 35 U.S.C. 154(b) by 175 days.

(21) Appl. No.: 18/605,012

(22) Filed: Mar. 14, 2024

(65) Prior Publication Data

US 2025/0289143 A1 Sep. 18, 2025

(51) Int. Cl.
| | |
|---|---|
| *G06F 17/00* | (2019.01) |
| *B25J 5/00* | (2006.01) |
| *B25J 13/08* | (2006.01) |
| *B25J 15/00* | (2006.01) |
| *B29C 70/38* | (2006.01) |

(52) U.S. Cl.
CPC .......... *B25J 15/0028* (2013.01); *B25J 5/005* (2013.01); *B25J 13/085* (2013.01); *B29C 70/38* (2013.01)

(58) Field of Classification Search
CPC ...... B25J 15/0028; B25J 5/005; B25J 13/085; B25J 9/026; B29C 70/38
USPC ........................................ 700/245
See application file for complete search history.

(56) References Cited

U.S. PATENT DOCUMENTS

| | | | |
|---|---|---|---|
| 7,206,665 B2 | 4/2007 | Groppe | |
| 9,498,887 B1 * | 11/2016 | Zevenbergen | ....... B25J 15/0052 |
| 10,155,367 B2 | 12/2018 | Crothers et al. | |
| 10,173,378 B2 | 1/2019 | Barton | |
| 10,414,042 B2 | 9/2019 | Gan et al. | |
| 10,821,713 B2 | 11/2020 | Sinha et al. | |
| 10,899,089 B2 | 1/2021 | Webb | |

(Continued)

FOREIGN PATENT DOCUMENTS

| | | | | |
|---|---|---|---|---|
| AU | 2013305559 A1 * | 4/2015 | ............. | A61B 34/30 |
| CN | 116117769 A * | 5/2023 | ............. | B25J 9/003 |

(Continued)

OTHER PUBLICATIONS

Machining with Robots (Year: 2009).*

*Primary Examiner* — Ronnie M Mancho
(74) *Attorney, Agent, or Firm* — Dority & Manning, P.A.

(57) ABSTRACT

An apparatus for controlling a ply of a composite material includes a robotic arm and an end effector mounted to the robotic arm. The end effector includes a base fixed to the robotic arm, a platform supported by the base, a disk supported by the platform, an arcuate track supported by the disk, and a ply manipulator extending from the arcuate track. The base includes a base track extending along a first translational dimension. The platform is movable along the base track and includes a platform track extending along a second translational dimension. The disk is movable along the platform track and is rotatable about a first rotational dimension. The arcuate track extends along a second rotational dimension. The ply manipulator is movable along the arcuate track.

20 Claims, 8 Drawing Sheets

(56) References Cited

U.S. PATENT DOCUMENTS

| | | | |
|---|---|---|---|
| 11,260,413 B2 | 3/2022 | Pedigo et al. | |
| 11,376,633 B1 * | 7/2022 | De La Rosa | B07C 5/36 |
| 11,628,624 B2 | 4/2023 | Malhan et al. | |
| 2020/0156260 A1 * | 5/2020 | Takasaki | B25J 9/142 |
| 2025/0216835 A1 * | 7/2025 | Seguias-Bandry | |
| | | | G05B 19/4155 |
| 2025/0289143 A1 * | 9/2025 | Sinha | B25J 9/026 |

FOREIGN PATENT DOCUMENTS

| | | | | |
|---|---|---|---|---|
| EP | 4353423 A1 * | 4/2024 | | B25J 9/046 |
| FR | 3160124 A1 * | 9/2025 | | B29C 70/38 |

* cited by examiner

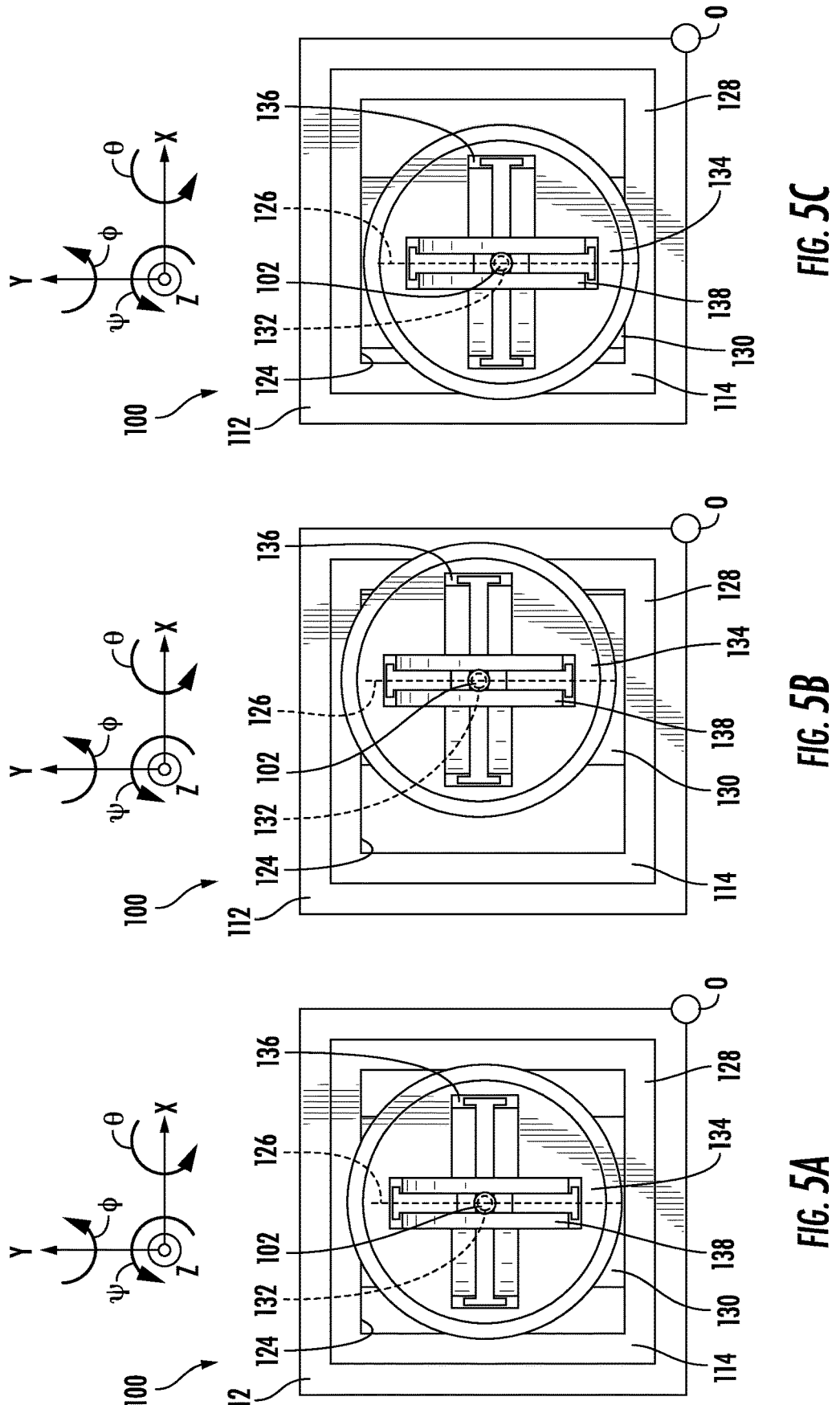

300

| SECURE FIRST END OF PLY | 302 |

| SECURE SECOND END OF PLY | 304 |

| DETECT FORCE BETWEEN END EFFECTOR AND FIRST END OF PLY | 306 |

| DETERMINE TRANSLATION AND ROTATION OF PLY | 308 |

| ACTUATE TRANSLATOR AND ROTATOR ACCORDING TO DETERMINED TRANSLATION AND ROTATION | 310 |

| MOVE PLY TO LAYUP DESTINATION | 312 |

ROBOTIC APPARATUS FOR CERAMIC MATRIX COMPOSITES

FIELD

The present disclosure relates generally to robotics and manipulating parts with a robot.

BACKGROUND

Modern manufacturing and repair processes often require highly precise and accurate object inspection and manipulation. When manufacturing articles with ceramic matrix composite (CMC) materials, robotic systems use high precision manipulators to move and rotate plies of the CMC material to form a layup. The layup is then processed to form the article. The high precision manipulators are controlled with computing systems that have high computation capacity and utilize coordination techniques with several robotic components to lay the plies.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 5A is a schematic view of the end effector moving in translational dimensions.

FIG. 5B is a schematic view of the end effector moving in translational dimensions.

FIG. 5C is a schematic view of the end effector moving in translational dimensions.

DETAILED DESCRIPTION

Figure 1:
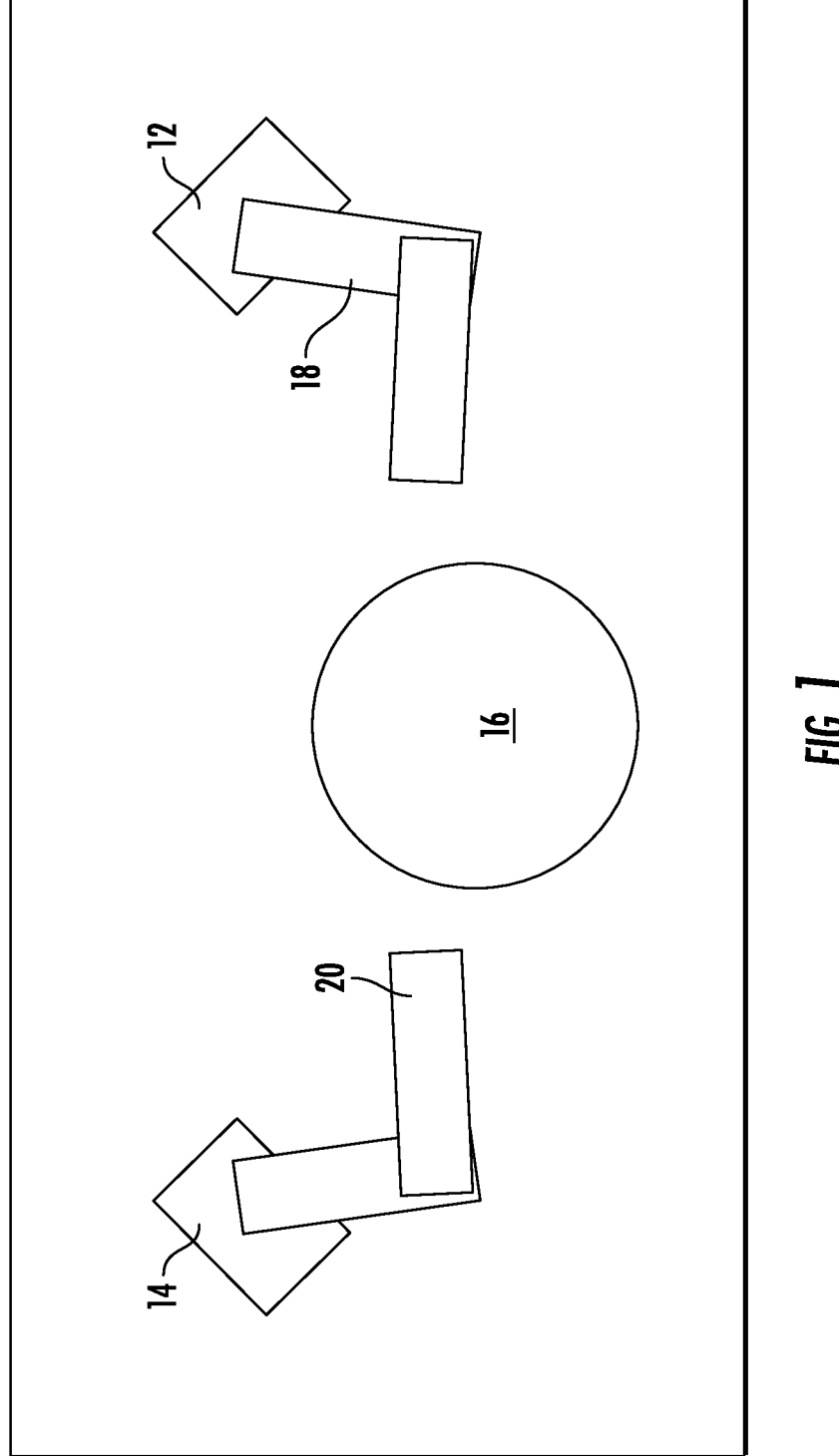
FIG. 1 is a top-down, schematic view of an exemplary system for laying plies of a CMC material into a layup.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

As used herein, the terms "first," "second," "third," and other ordinals are used to distinguish one component from another and are not intended to signify location or importance of the individual components.

As used herein, a "dimension" is a measurable extent of a degree of freedom of an object. For example, in a Cartesian coordinate system, three axes define six dimensions: a translational dimension along each of the three axes, and a rotational dimension about each of the three axes. An object is movable in a dimension when a position of the object is free to change along or about the axis defining the dimension.

As used herein, ceramic-matrix-composite or "CMC" refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide $(Al_2O_3)$, silicon dioxide $(SiO_2)$, aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide $(Al_2O_3)$, silicon dioxide $(SiO_2)$, aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide $(Al_2O_3)$, silicon dioxide $(SiO_2)$, aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may be comprised of a matrix and reinforcing fibers comprising oxide-based materials such as aluminum oxide $(Al_2O_3)$, silicon dioxide $(SiO_2)$, aluminosilicates, and mixtures thereof. Aluminosilicates can include crystalline materials such as mullite $(3Al_2O_3.2SiO_2)$, as well as glassy aluminosilicates.

In certain embodiments, the reinforcing fibers may be bundled or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer. The present disclosure is generally related to manipulation of plies of a composite material, such as a CMC material, to form a composite article. Placing the plies into a high curvature mold uses operation software that considers six degrees of freedom (DOF). The six DOF correspond to movement along three translational dimensions and three rotational dimensions. Handling of plies in six DOF uses high-precision and narrow time-synchronization techniques for robotic arms that manipulate the plies. Tolerance stackups may cause stresses in the plies that reduce precision of placement of the plies in the layup or disrupt the plies to create inconsistencies in the final article.

An end effector that includes a translator to control an additional three translational dimensions and a rotator to control an additional three rotational dimensions improves precision of the ply manipulation by bypassing the tolerance stackup of the robotic arms. More specifically, the end effector moves the ply to a specific orientation in a coordinate system that is local to the end effector, reducing the effects of tolerance stackup. The orientation is specified to reduce stresses in the ply, improving precision of manipulation of the ply and reducing stress-induced disruption. With the improved precision, the plies are laid up with fewer discrepancies and improved strength.

Referring now to the figures, wherein identical numerals indicate the same elements throughout the figures, FIG. 1 is a block diagram of an exemplary system 10 for laying plies of a composite material into a layup. The system 10 includes a first robot 12, a second robot 14, and a layup region 16. The first robot 12 and the second robot 14 are configured to engage opposing ends of a ply of composite material (FIG. 2) and to lay the ply onto the layup region 16. More specifically, the first robot 12 includes a first robotic arm 18, and the second robot 14 includes a second robotic arm 20. The plies are laid on the layup region 16 into a layup for further processing. The layup region 16 may be a suitable location to lay the ply, such as a table, a turntable, a ply stack, or a composite body. The composite material may be a ceramic matrix composite (CMC) material, as described above. It will be appreciated that the composite material may be a different material, such as a polymer matrix composite (PMC) material. The PMC material may include a fiber preform including fibers of glass, carbon, silicon carbide, alumina, oxide or combinations thereof. Additionally, the fibers may be combined with polymeric materials including, but not limited to, thermoplastics, polyimides, polyethylenes, epoxies, phenolic systems, or combinations thereof.

Figure 2:
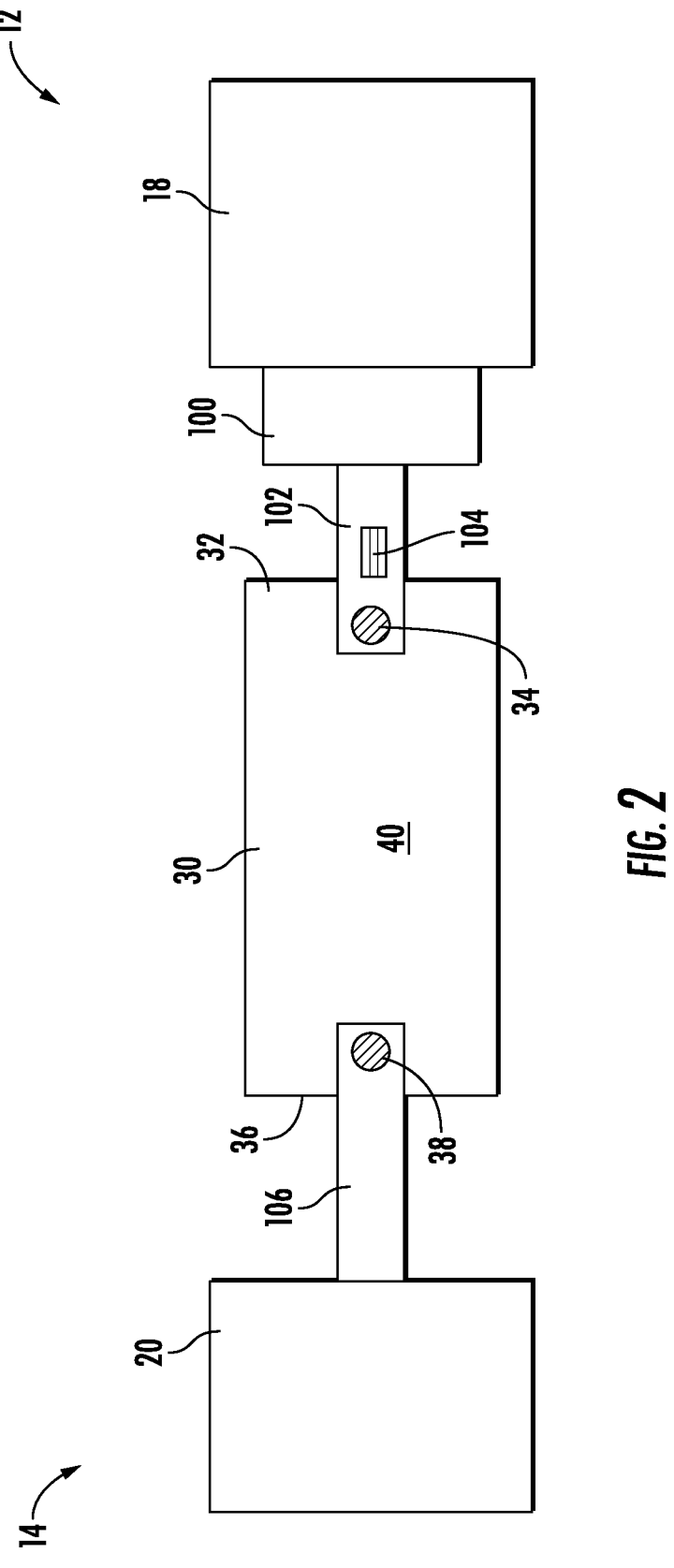
FIG. 2 is a schematic view of robotic arms manipulating one of the plies of the CMC material.

Now referring to FIG. 2, a schematic view of the robots 12, 14 engaging a ply 30 of a composite material, such as a CMC material, is provided. More specifically, the first robotic arm 18 engages a first end 32 of the ply 30 at a first securing location 34, and the second robotic arm 20 engages a second end 36 of the ply 30 at a second securing location 38. It will be appreciated that the securing locations 34, 38 may be a point, two or more points, a line, two or more lines, an area, or combinations thereof.

The first robotic arm 18 includes an end effector 100, a ply manipulator 102, and an optional force sensor 104. The end effector 100 is mounted to the first robotic arm 18, such as with fasteners, press fits, threads, or combinations thereof. As described in greater detail below, the end effector 100 is movable in six degrees of freedom (DOF) to control movement of the first end 32 of the ply 30.

The ply manipulator 102 extends from the end effector 100 and engages the first end 32 of the ply 30 at the first securing location 34. The ply manipulator 102 includes one or more devices that secure the ply 30 at the first securing location 34. For example, the ply manipulator 102 may be a gripper or a grabber that includes two movable fingers. The two movable fingers are arranged on a top side 40 and a bottom side (not shown) of the ply 30 and engage the ply 30 at the first securing location 34. As another example, the ply manipulator 102 may be a claw that supports the ply 30 from the bottom side. As yet another example, the ply manipulator 102 may be a pair of rollers that secure the top side 40 and the bottom side of the ply 30.

The force sensor 104 detects a force between the end effector 100 and the first end of the ply. More specifically, the force sensor 104 collects data indicating stresses of the first end 32 of the ply 30 caused by engagement of the ply 30 by the ply manipulator 102. As an example, the force sensor 104 may be a piezoelectric sensor that generates electrical current upon application of a force, and the electrical current may be measured by a controller or processor (FIG. 6) to generate data indicating the specific amount of force experienced by the ply 30. The force sensor 104 is disposed on the end effector 100, such as on the ply manipulator 102.

The second robotic arm 20 includes a second ply manipulator 106 that engages the second end 36 of the ply 30 at the second securing location 38. As with the ply manipulator 102, the second ply manipulator 106 may be a grabber or gripper with two movable fingers that grip the ply 30 at the second securing location 38.

Figure 3:
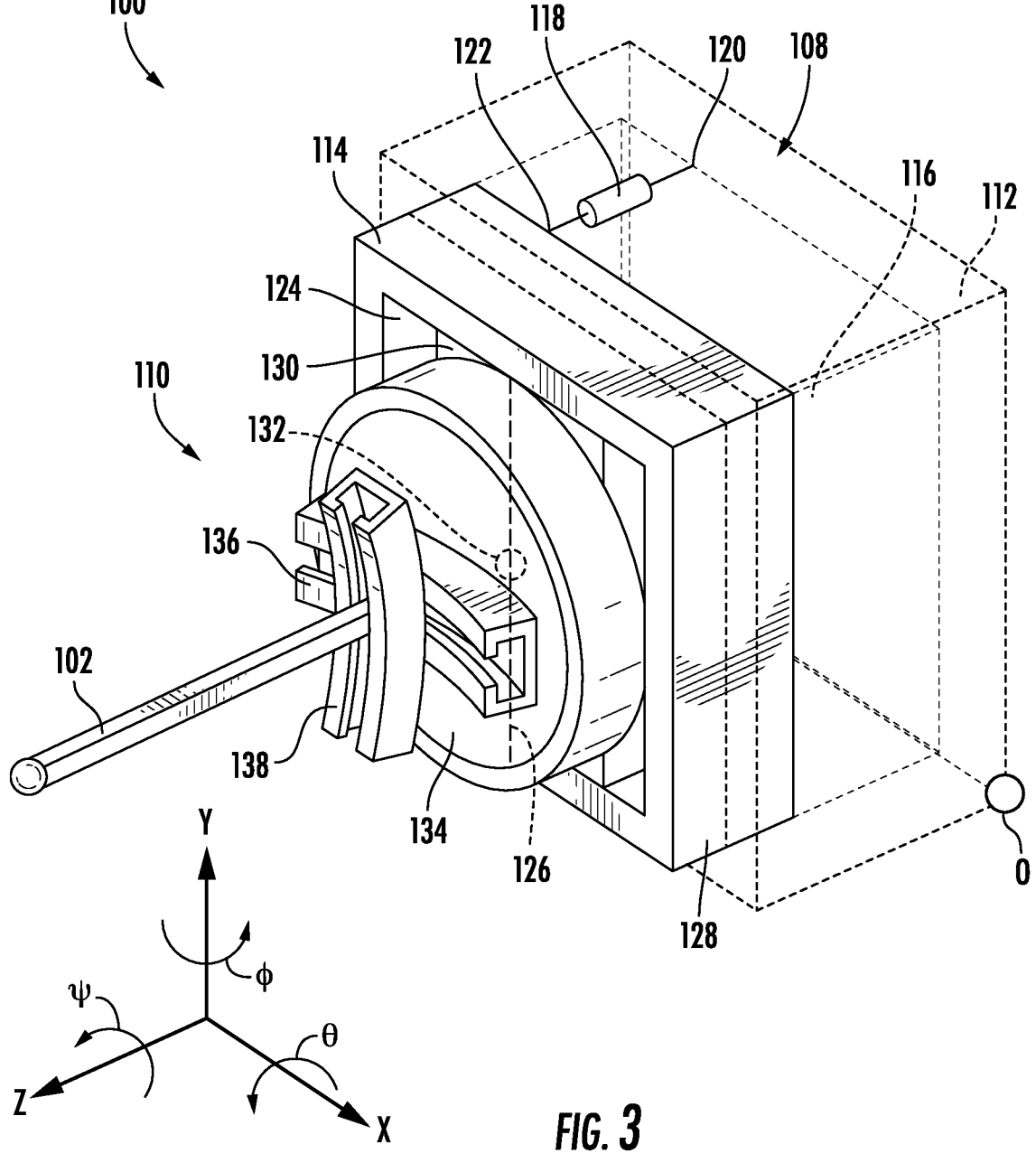
FIG. 3 is a perspective schematic view of an end effector of one of the robotic arms.
Figure 4:
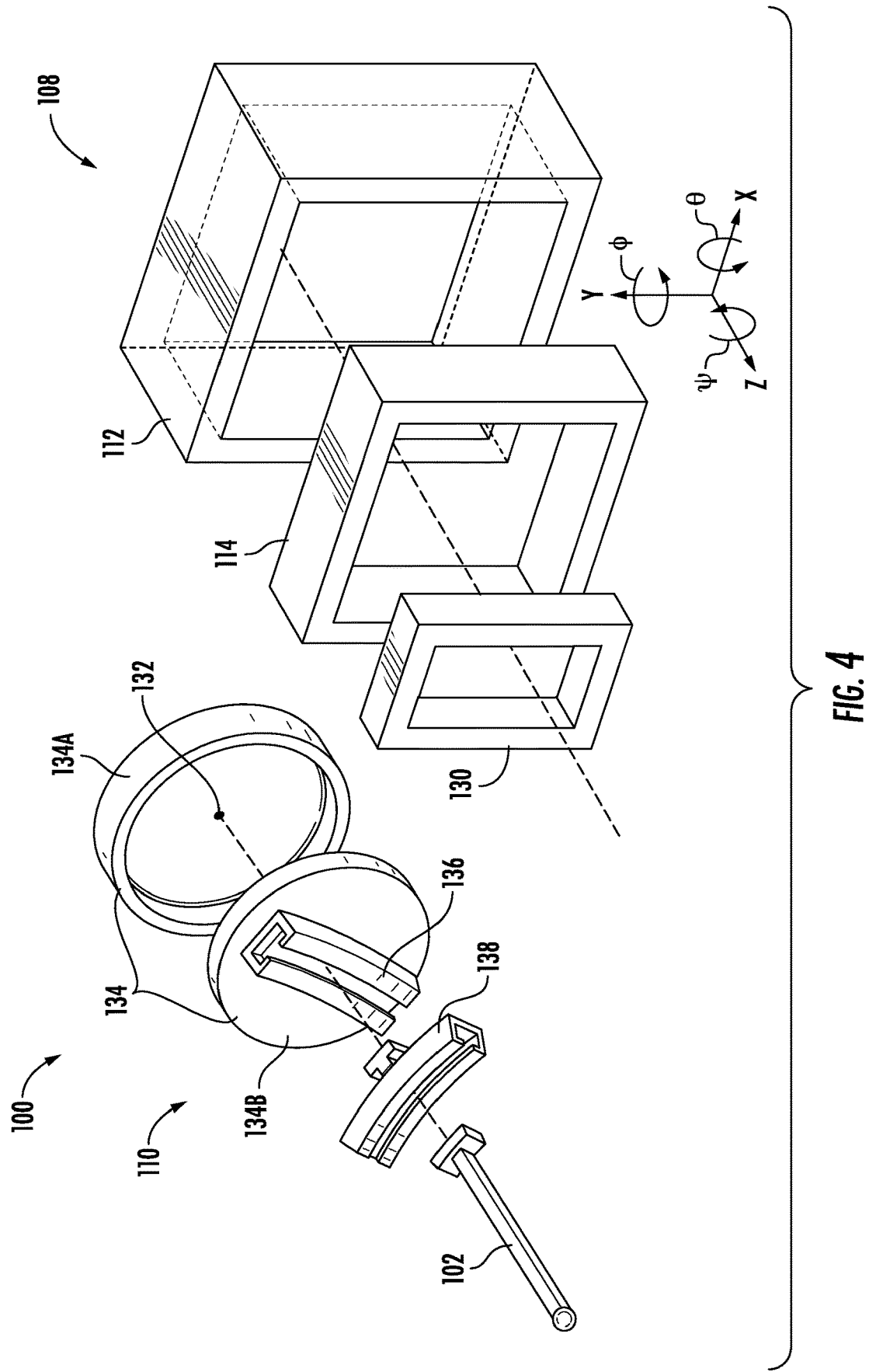
FIG. 4 is an exploded view of the end effector of FIG. 3.

Now referring to FIGS. 3-4, an end effector 100 is shown. FIG. 3 shows a perspective view of the end effector 100. FIG. 4 shows an exploded view of the end effector 100.

The end effector 100 includes a translator 108, a rotator 110, and the ply manipulator 102. The translator 108 is a linear portion of the end effector 100 that is movable in three translational dimensions, and the rotator 110 is a rotatable portion of the end effector 100 that is movable in three rotational dimensions. Thus, the ply manipulator 102 is movable by the translator 108 and the rotator 110 along the three translational dimensions and the three rotational dimensions. The translational and rotational motion of the end effector 100 allows the ply manipulator 102 to adjust the ply in six degrees of freedom to reduce stresses in the ply. In the context of FIGS. 3-4, the three translational dimensions are represented in a three-dimensional coordinate system along first, second, and third axes represented in the three-dimensional coordinate system as X, Y, Z, and the three rotational dimensions are represented in the three-dimensional coordinate system as $\theta$, $\phi$, $\psi$, representing 6 DOF. The axes X, Y, Z are orthogonal to each other, such that the X axis is orthogonal to the Y axis, the Y axis is orthogonal to the Z axis, and the X axis is orthogonal to the Z axis. The end effector 100 defines an origin O of the three-dimensional coordinate system to define coordinates that locate the ply manipulator 102.

The translator 108 includes a base 112 fixed to the first robotic arm 18 (FIG. 2) and a platform 114 supported by the base 112. The base 112 moves other parts of the end effector 100 with the first robotic arm 18 (FIG. 2). The base 112 includes a base track 116 extending along a first translational dimension. In the exemplary end effector 100 of FIG. 3, the base track 116 extends along the Z axis. The platform 114 moves along the base track 116 to move the ply manipulator 102 forward and backward along the Z axis.

The end effector 100 may include one or more devices 118 to move the platform 114 along the base track 116, such as a linear actuator or a spring. More specifically, the device 118 may be a spring having a first end fixed to the base 112 at a base location 120 and a second end fixed to the platform 114 at a platform location 122. Forces from the ply 30 may compress or release the spring, moving the platform 114 along the Z axis in the base track 116 in a passive manner.

Alternatively, the device 118 may be a linear actuator having a first end fixed to the base 112 at the base location 120 and a second end fixed to the platform 114 at the platform location 122. The linear actuator is actuated to move the platform 114 in the base track 116 along the Z axis in an active manner. The linear actuator may be any suitable type, such as a hydraulic actuator, a pneumatic actuator, an electric actuator, or combinations thereof.

The platform 114 includes a platform track 124 extending along a second translational dimension and a second platform track 126 extending along a third translational dimension. The platform track 124 extends along the X axis, and the second platform track 126 extends along the Y axis. More specifically, the platform 114 includes an outer portion 128 and an inner portion 130. The platform track 124 is defined in the outer portion 128, and the inner portion 130 moves in the platform track 124 along the X axis. The second platform track 126 is defined in the inner portion 130, extending along the Y axis. The platform 114 may include one or more devices (not depicted) to move the inner portion 130 along the platform track 124, such as a linear actuator as described above.

The rotator 110 is supported by the inner portion 130 of the platform 114 to move the rotator 110 along the platform track 124. More specifically, the rotator 110 includes a post 132 slidable along the second platform track 126. The post 132 extends from the inner portion 130 and holds other parts of the rotator 110 to the inner portion 130 as the inner portion 130 (and the ply manipulator 102) move along the X axis. The post 132 is movable along the second platform track 126, thereby moving the rotator 110 (and the ply manipulator 102) along the Y axis. The inner portion 130 of the platform 114 may include one or more devices (not depicted) or other features to move or cause movement of the post 132 along the second platform track 126, such as a spring or a linear actuator as described above. As an example, the end effector 100 may include a spring having a first end fixed to the inner portion 130 of the platform 114 and a second end fixed to the rotator 110.

The rotator 110 includes a disk 134 rotatably supported by the post 132 and rotatable in the first rotational dimension, indicated by the ψ direction that rotates about the Z axis. The rotator 110 includes an actuator, such as a motor, a gear, or combinations thereof, that is configured to rotate the disk 134 about the post 132 in an active manner. The disk 134 rotates the ply manipulator 102 in the ψ direction. In the exemplary embodiment of FIGS. 3-4, the disk 134 may be a two-piece construction including a housing 134A and an insert 134B. Alternatively, the disk 134 may be a one-piece monolithic construction.

The rotator 110 includes an arcuate track 136 supported by the disk 134. The arcuate track 136 extends along a second rotational dimension, indicated in FIG. 3 by the φ direction that rotates about the Y axis. The ply manipulator 102 moves along the arcuate track 136 to move in the φ direction. The rotator 110 includes an actuator configured to move the ply manipulator 102 along the arcuate track 136, such as an actuator, a curved gantry, or combinations thereof.

The rotator 110 may include a second arcuate track 138 supported by the disk 134, the arcuate track 136, or both. The second arcuate track 138 extends along a third rotational dimension, indicated in FIG. 3 by the θ direction about the X axis. The ply manipulator 102 moves along the second arcuate track 138 to move in the θ direction. It will be appreciated that, as the disk 134 rotates in the ψ direction, the arcuate tracks 136, 138 rotate in the ψ direction such that movement along the arcuate tracks 136, 138 may result in rotation in both the θ, φ directions while the arcuate tracks 136, 138 maintain rotational dimensions that orthogonal to each other. That is, the three rotational dimensions remain orthogonal to each other even when the arcuate tracks 136, 138 rotate away from the X and Y axes depicted in FIGS. 3-4. The rotator 110 may include a second actuator configured to move the ply manipulator 102 along the second arcuate track 138, such as a curved actuator, a curved gantry, or combinations thereof.

In the exemplary end effector, the first arcuate track 136 and second arcuate track 138 are configured such that their center of curvatures are concentric with each other and with a specified point, often referred to as the tool center point, on the ply manipulator 102 such that rotation about φ or θ may be achieved without translation of this point.

With reference to FIGS. 5A-5C, exemplary views of the end effector 100 are provided. FIG. 5A shows the end effector 100 in a default position. FIG. 5B shows the end effector 100 after the inner portion 130 moves in the platform track 124 along the X axis. FIG. 5C shows the end effector 100 after the post 132 moves in the second platform track 126 along the Y axis.

As shown in FIG. 5A, the end effector 100 may define a default position for the ply manipulator 102. In the default position, the robotic arm has moved the end effector 100 to engage the ply with the ply manipulator 102, and the end effector 100 has not performed any corrective actions based on data from the force sensor 104. The default position is a set of coordinates from which the end effector 100 moves the ply manipulator 102 to reduce stresses in the ply.

As shown in FIG. 5B, the inner portion 130 of the platform 114 moves in the platform track 124 along the X axis. More specifically, a spring or a linear actuator moves the inner portion 130 to move the ply manipulator 102 along the X axis. When the ply is positioned too far in a negative direction along the X axis from the tolerance stackup, the stresses in the ply are increased. To reduce the stresses in the ply, the ply manipulator 102 moves in a positive direction along the X axis, returning the ply to its intended location and reducing the stresses in the ply. The end effector 100 thus moves the ply manipulator 102 along one degree of freedom of the three translational dimensions.

As shown in FIG. 5C, the inner portion 130 of the platform 114 moves in the platform track 124 along the X axis and the post 132 moves in the second platform track 126 along the Y axis. More specifically, the inner portion 130 and the post 132 move independently to move the ply manipulator 102 along the X and Y axes. The end effector 100 thus moves the ply manipulator 102 along two degrees of freedom of the three translational dimensions. While not shown in FIGS. 5A-5C, the outer portion 128 of the platform 114 may move along the Z axis such that the end effector 100 moves the ply manipulator 102 along the X, Y, and Z axes, i.e., all three degrees of freedom of the three translational dimensions.

Figures 6A, 6B, 6C:
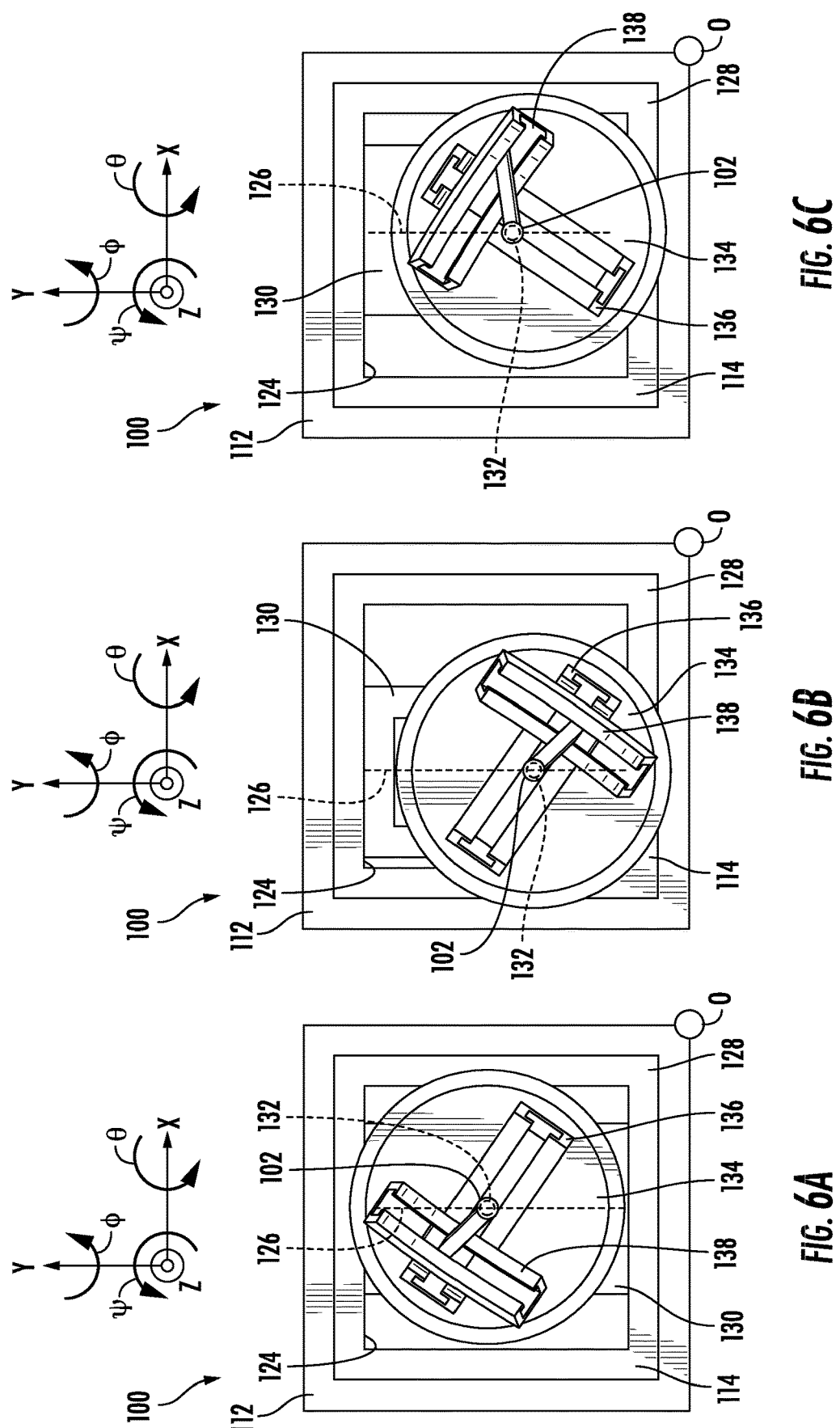
FIG. 6A is a schematic view of the end effector moving in rotational dimensions.
FIG. 6B is a schematic view of the end effector moving in rotational dimensions.
FIG. 6C is a schematic view of the end effector moving in rotational dimensions.

Now referring to FIGS. 6A-6C, additional exemplary views of the end effector 100 are provided. FIG. 6A shows the end effector 100 rotating the ply manipulator 102 in the ψ direction and in the ϕ direction. FIG. 6B shows the end effector 100 rotating the ply manipulator 102 in the ψ, ϕ directions and along the X, Y axes. FIG. 6C shows the end effector 100 rotating the ply manipulator 102 in the ψ, ϕ, θ directions and along the X, Y axes.

As shown in FIG. 6A, the ply manipulator 102 moves along the arcuate track 136 and around the disk 134 to rotate in two rotational dimensions. More specifically, the ply manipulator 102 slides along the arcuate track 136 to rotate the ply manipulator 102 along two degrees of freedom of the three rotational dimensions. Such a rotation may reduce torsional stresses in the ply. One or more rotational actuators may move the ply manipulator 102 within the arcuate track 136 and around the disk 134.

As shown in FIG. 6B, the ply manipulator 102 rotates in two rotational dimensions and translates along two translational dimensions. More specifically, the inner portion 130 of the platform 114 moves in the platform track 124, the post 132 moves in the second platform track 126, the disk 134 rotates, and the ply manipulator 102 moves in the arcuate track 136. The movement of the ply manipulator 102 along two rotational dimensions and two translational dimensions (4 DOF) may reduce torsional stresses in the ply.

As shown in 6C, the ply manipulator 102 rotates in three rotational dimensions and moves along the two translational dimensions. More specifically, the inner portion 130 of the platform 114 moves in the platform track 124, the post 132 moves in the second platform track 126, the disk 134 rotates, the ply manipulator 102 moves in the arcuate track 136, and the ply manipulator 102 moves in the second arcuate track 138. The movement of the ply manipulator 102 along three rotational dimensions and two translational dimensions (5 DOF) may reduce torsional stresses in the ply. It will be appreciated that movement of ply manipulator 102 along the three rotational dimensions may also allow the ply to be shaped into a form which facilitates layup onto a mold surface.

Figure 7:
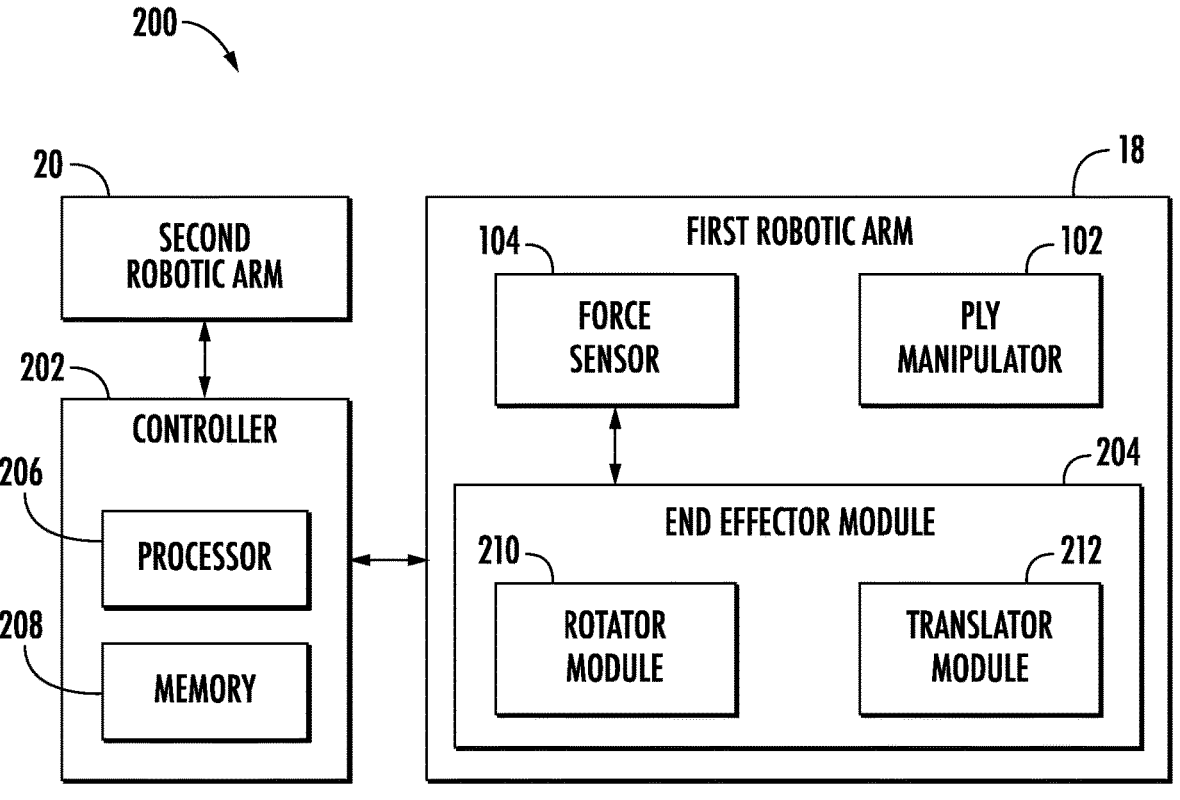
FIG. 7 is a block diagram of an exemplary system for controlling the end effector.

With reference to FIG. 7, a block diagram of a system 200 for controlling a first robotic arm 18, a second robotic arm 20, and an end effector 100 for the first robotic arm 18 is shown. The system 200 includes a controller 202 and an end effector module 204. The controller 202 and the end effector module 204 communicate via a suitable wired or wireless network. More specifically, the end effector module 204 provides data to the controller 202, and the controller 202 provides instructions to the end effector module 204 and a ply manipulator 102 based on the collected data.

Referring particularly to the operation of the controller 202, in at least certain embodiments, the controller 202 can include one or more processors 206 and one or more memory devices 208. The one or more processors 206 can include any suitable processing device, such as a microprocessor, microcontroller, integrated circuit, logic device, and/or other suitable processing device. The one or more memory devices 208 can include one or more computer-readable media, including, but not limited to, non-transitory computer-readable media, RAM, ROM, hard drives, flash drives, and/or other memory devices.

The one or more memory devices 208 can store information accessible by the one or more processors 206, including computer-readable instructions that can be executed by the one or more processors 206. The instructions can be any set of instructions that when executed by the one or more processors 206, cause the one or more processors 206 to perform operations. In some embodiments, the instructions can be executed by the one or more processors 206 to cause the one or more processors 206 to perform operations, such as any of the operations and functions for which the controller 202 is configured, the operations for laying a ply 30 (such as the process 300 of FIG. 7), as described herein, any other operations or functions of the one or more processor 206, or combinations thereof. The instructions can be software written in any suitable programming language or can be implemented in hardware. Additionally, and/or alternatively, the instructions can be executed in logically and/or virtually separate threads on the one or more processors 206. The one or more memory devices 208 can further store data that can be accessed by the one or more processors 206.

The controller 202 is configured to actuate the ply manipulator 102 to secure an end of the ply 30. More specifically, the controller 202 provides instructions to the ply manipulator 102 to engage or release a first end 32 of the ply 30 (FIG. 2). The ply manipulator 102 may include an actuator or other mechanical device that, upon receiving instructions from the controller 202, engages or releases the first end 32 of the ply 30 (FIG. 2).

The controller 202 is configured to move the ply 30 to a specified position in a three-dimensional coordinate system. In order to lay the ply 30, the controller 202 identifies an initial position of the ply 30, a layup destination of the ply 30, and a path from the initial position to the layup destination which may include multiple intermediate positions. The initial position, intermediate positions, and the layup destination are each a respective set of coordinates and angles in the three-dimensional coordinate system which fully define the location and orientation of the ply input to the controller 202, and the path is a set of coordinates and angles in the three-dimensional coordinate system along which the robotic arms move the ply 30. As described above, tolerance stackup may cause the ply 30 to deviate from the initial position, causing mechanical stresses in the ply 30.

The end effector module 204 is configured to adjust the ply 30 to a nominal position, reducing stresses in the ply 30. More specifically, the end effector module 204 receives data from the controller 202 indicating that the plymanipulator 102 has engaged the end of the ply 30 and instructions from the controller 202 to adjust the position of the ply 30 to the nominal position. The nominal position of the ply 30 input to the controller 202 may be defined as a combination one or more of: its area, perimeter, major dimension length, minor dimension length, or combinations thereof. For example, the nominal position of the ply 30 may be the set of coordinates in the coordinate system defining the perimeter of the ply 30.

Upon receiving the instructions from the controller 202, the end effector module 204 collects data from a force sensor 104 indicative of the force acting on the ply 30. The force data may include data indicating forces applied in three translational dimensions (e.g., X, Y, Z axes) and in three rotational dimensions (e.g., ψ, ϕ, θ directions). When forces in one or more of the translational or rotational dimensions exceed a force threshold, the end effector module 204 instructs a rotator module 210 to rotate the ply manipulator 102 and a translator module 212 to translate the ply manipulator 102 to a specified direction to reduce the forces as detected by the force sensor 104 to a specified force below the force threshold. The rotator module 210 instructs one or more of the actuators or rotator 110 to rotate components of the end effector 100, such as the disk 134, the arcuate track 136, or the second arcuate track 138 as described above. The translator module 212 instructs one of more actuators of the translator 108 to translate components of the end effector 100, such as a platform 114 or a post 132 as described above. Following rotation and translation of the ply 30, the end effector controller 204 collects additional data from the force sensor 104 to determine the force experienced by the ply 30. When the data from the force sensor 104 indicate that the forces in the ply 30 are below the force threshold, the end effector controller 204 sends instructions to the controller 202. While one force sensor 104 is described herein, it will be appreciated that the end effector module 204 may collect data from more than one force sensor 104.

Upon receiving the instructions from the end effector module 204, the controller 202 actuates the first robotic arm 18 and the second robotic arm 20 to move the ply 30 along the path to the layup destination. Because the end effector controller 204 moved the ply manipulator 102 with improved precision to reduce stresses in the ply 30, the ply 30 is laid onto the layup destination with fewer deviations than the robotic arms 18, 20 may move the ply 30 alone.

Additional instructions may be provided to the end effector controller 204 to rotate along the three rotational directions (e.g., $\psi$, $\phi$, $\theta$ directions) to achieve a state that improves layup of the ply 30. In one example, this may include translating and rotating the ply 30 to a predetermined intermediate position chosen to move the ply 30 to a mold surface without unspecified contact with other parts of the mold surface. The "intermediate position" is a position between the nominal position and the mold surface that allows for movement of the ply 30 to the mold surface without unspecified contact with other surfaces or to control the order in which one or more regions of the ply 30 come into contact with the mold surface. In another example, this may include translations and rotations of the ply 30 while the ply 30 is placed onto the mold surface to control the order in which various regions of the surface of the ply 30 come in contact with the mold surface, thereby reducing or inhibiting disruptions of the ply 30.

Figure 8:
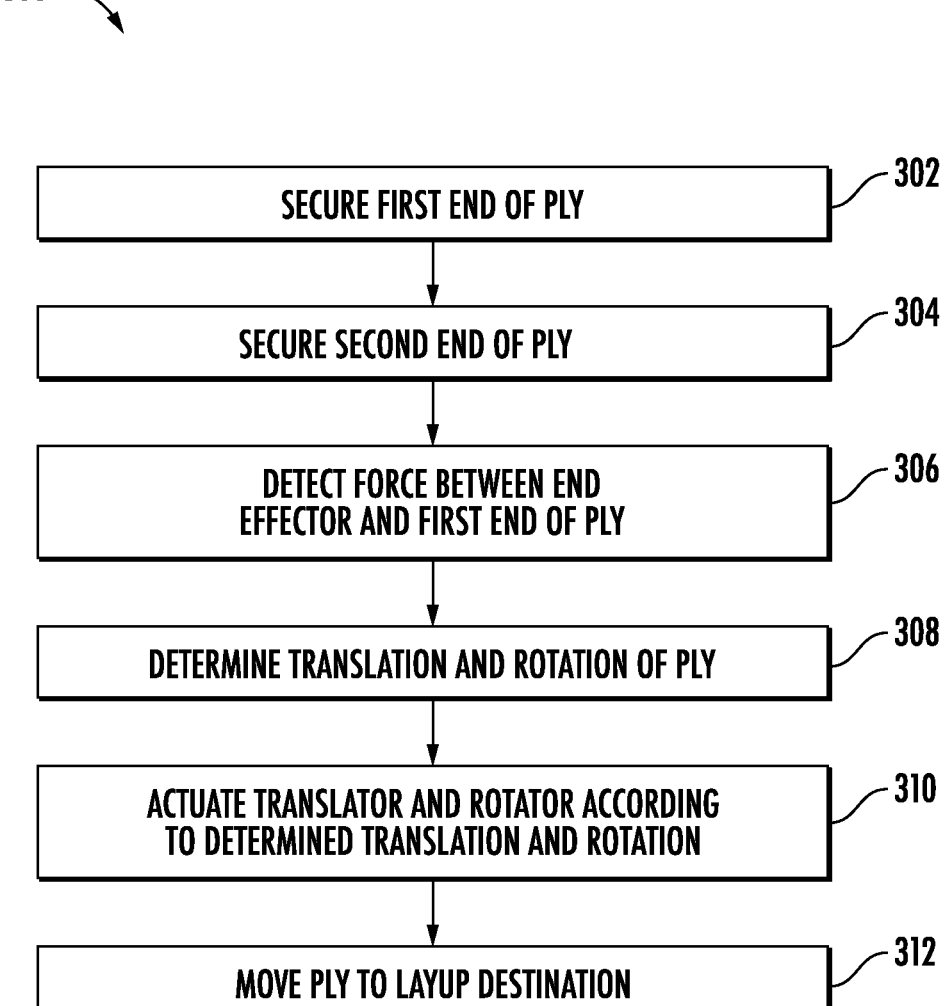
FIG. 8 is a block diagram of an exemplary process for laying the plies of the CMC material.

Referring now to FIG. 8, a flow diagram of a process 300 of laying a ply of a composite material in accordance with an exemplary aspect of the present disclosure is provided. The process 300 of FIG. 8 may be utilized to lay one or more of the exemplary CMC plies described above. Accordingly, it will be appreciated that the process 300 may generally be utilized to lay plies for any suitable composite material.

The process 300 begins at a step (302), in which a first robotic arm secures a first end of the ply of the composite material. The controller instructs a ply manipulator to secure the first end of the ply at a securing location. More specifically, the first robotic arm includes an end effector, and the ply manipulator extends from the end effector to engage the first end of the ply. The end effector is movable in at least two translational dimensions and at least two rotational dimensions.

The process 300 continues at a step (304), in which a second robotic arm secures a second end of the ply. The controller instructs a ply manipulator attached to the second robotic arm to secure the second end of the ply at a securing location.

The process 300 continues at a step (306), in which a force sensor detects a force between the first end of the ply and the end effector. The force sensor collects force data indicating magnitudes and directions of forces experienced by the ply. The source sensor transmits the collected force data to an end effector module of the end effector.

The process 300 continues at a step (308), in which the end effector controller determines a translation and a rotation of the ply to reduce the detected force to a specified force below a force threshold. More specifically, the end effector controller determines a specified position to move the securing location of the ply to reduce the detected force to the specified force. Based on the direction and magnitude of the force data, the end effector controller determines the specified position such that movement of the ply to the specified position would cause the ply to experience lower forces, reducing stresses in the ply. To reach the specified position, the end effector controller determines the translation in up to three translational dimensions and the rotation in up to three rotational dimensions, as described above.

The process 300 continues at a step (310), in which the end effector controller actuates the translator to translate the ply and the rotator to rotate the ply to the specified position according to the determined translation and rotation. As described above, the translator includes one or more components (such as a platform and a post) that move the ply manipulator along three translational dimensions, and the rotator includes one or more components (such as an arcuate track and a disk) that move the ply manipulator along three rotational dimensions. To perform the translation and rotation, the end effector controller actuates one or more linear actuators of the translator and one or more rotational actuators of the rotator to move the ply manipulator to the specified position.

The process 300 continues at a step (312), in which the controller actuates the first robotic arm and the second robotic arm to move the ply along a predetermined path to the layup destination. After performing the translation and the rotation, the end effector controller sends an instruction to the controller to move the ply. The controller includes the predetermined path from an initial position to the layup destination that the ply travels. The controller instructs the first robotic arm and the second robotic arm to move the ply along the predetermined path, laying the ply at the layup destination. Following the step (312), the process 300 may return to the step (302) to move another ply. Otherwise, the process 300 ends.

Further aspects are provided by the subject matter of the following clauses:

An apparatus for controlling a ply of a composite material, the apparatus including a robotic arm and an end effector mounted to the robotic arm. The end effector includes a base fixed to the robotic arm, the base including a base track extending along a first translational dimension, a platform supported by the base and movable along the base track, the platform including a platform track extending along a second translational dimension, a disk supported by the platform and movable along the platform track, the disk being rotatable about a first rotational dimension, an arcuate track supported by the disk, the arcuate track extending along a second rotational dimension, and a ply manipulator extending from the arcuate track and movable along the arcuate track.

The apparatus of any of the preceding clauses, wherein the end effector further includes a second arcuate track extending along a third rotational dimension, wherein the second arcuate track is supported by the disk and the arcuate track is supported by the second arcuate track.

The apparatus of any of the preceding clauses, wherein the end effector further includes a first actuator configured to rotate the disk about the first rotational dimension and a second actuator configured to move the ply manipulator along the arcuate track.

The apparatus of any of the preceding clauses, wherein the platform includes a second platform track extending along a third translational dimension, and the disk is movable along the second platform track.

The apparatus of any of the preceding clauses, wherein the end effector further includes a spring having a first end fixed to the base and a second end fixed to the platform.

The apparatus of any of the preceding clauses, wherein the end effector further includes a linear actuator having a first end fixed to the base and a second end fixed to the platform.

The apparatus of any of the preceding clauses, wherein the end effector further includes a spring having a first end fixed to the platform and a second end fixed to the disk.

The apparatus of any of the preceding clauses, wherein the end effector further includes a post slidable along the platform track, wherein the disk is rotatably supported by the post.

The apparatus of any of the preceding clauses, further including a controller configured to actuate the ply manipulator to secure an end of the ply and to rotate the disk and the arcuate track to move the ply to a specified position in the first translational dimension and the second translational dimension and the first rotational dimension and the second rotational dimension, the specified position defined by a set of coordinates in the first translational dimension and the second translational dimension and the first rotational dimension and the second rotational dimension.

The apparatus of any of the preceding clauses, wherein the end effector defines an origin in a three-dimensional coordinate system and the first translational dimension and the second translational dimension define a first axis and a second axis of the three-dimensional coordinate system, the first axis being orthogonal to the second axis.

The apparatus of any of the preceding clauses, wherein the end effector is movable along a third translational dimension defining a third axis of the three-dimensional coordinate system, the third axis being orthogonal to the first axis and the second axis.

The apparatus of any of the preceding clauses, wherein the platform is movable along two of the first axis, the second axis, and the third axis of the three-dimensional coordinate system, and wherein the base is movable along a remaining one of the first axis, the second axis, and the third axis of the three-dimensional coordinate system.

A method for laying a ply of a composite material, the method including securing a first end of the ply with an end effector of a first robotic arm, the end effector movable in at least two translational dimensions and at least two rotational dimensions, securing a second end of the ply with a second robotic arm, translating and rotating the first end of the ply with the end effector to a specified position in the at least two translational dimensions and the at least two rotational dimensions, and moving the ply with the first robotic arm and the second robotic arm along a predetermined path onto a layup destination.

The method of any of the preceding clauses, wherein the end effector includes a linear portion and rotatable portion, wherein translating the first end of the ply further includes translating the first end of the ply in the at least two translational dimensions with the linear portion and rotating the first end of the ply in the at least two rotational dimensions with the rotatable portion.

The method of any of the preceding clauses, further including actuating a linear actuator to translate the linear portion and actuating a rotational actuator to rotate the rotatable portion.

The method of any of the preceding clauses, further including detecting a force between the first end of the ply and the end effector and determining the specified position to reduce the force detected below a force threshold.

The method of any of the preceding clauses, further including determining the specified position to reduce the force detected to a specified force, the specified force being below the force threshold.

The method of any of the preceding clauses, wherein detecting the force further includes collecting force data from a force sensor.

The method of any of the preceding clauses, further including translating and rotating the first end of the ply with the end effector to the specified position in three translational dimensions and three rotational dimensions, the specified position defined by a set of coordinates in the three translational dimensions and the three rotational dimensions.

An apparatus for controlling a ply of a composite material, the apparatus including a first robotic arm configured to control a position of a first location of the ply in multiple degrees of freedom, the multiple degrees of freedom including one or more translational degrees of freedom and one or more rotational degrees of freedom, and a second robotic arm configured to control a position of a second location of the ply in the multiple degrees of freedom, the first robotic arm and the second robotic arm configured to place the ply at a layup destination, wherein the first robotic arm further includes an end effector, the end effector including a translator configured to control the position of the first location of the ply in the one or more translational degrees of freedom and a rotator configured to control the position of the first location of the ply in the one or more rotational degrees of freedom.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An apparatus for controlling a ply of a composite material, the apparatus comprising:

a robotic arm; and an end effector mounted to the robotic arm, the end effector comprising:

a base fixed to the robotic arm, the base including a base track extending along a first translational dimension;

a platform supported by the base and movable along the base track, the platform including a platform track extending along a second translational dimension;

a disk supported by the platform and movable along the platform track, the disk being rotatable about a first rotational dimension;

an arcuate track supported by the disk, the arcuate track extending along a second rotational dimension; and a ply manipulator extending from the arcuate track and movable along the arcuate track.

2. The apparatus of claim 1, wherein the end effector further comprises a second arcuate track extending along a third rotational dimension, wherein the second arcuate track is supported by the disk and the arcuate track is supported by the second arcuate track.

3. The apparatus of claim 1, wherein the end effector further comprises a first actuator configured to rotate the disk about the first rotational dimension and a second actuator configured to move the ply manipulator along the arcuate track.

4. The apparatus of claim 1, wherein the platform comprises a second platform track extending along a third translational dimension, and the disk is movable along the second platform track.

5. The apparatus of claim 1, wherein the end effector further comprises a spring having a first end fixed to the base and a second end fixed to the platform.

6. The apparatus of claim 1, wherein the end effector further comprises a linear actuator having a first end fixed to the base and a second end fixed to the platform.

7. The apparatus of claim 1, wherein the end effector further comprises a spring having a first end fixed to the platform and a second end fixed to the disk.

8. The apparatus of claim 1, wherein the end effector further comprises a post slidable along the platform track, wherein the disk is rotatably supported by the post.

9. The apparatus of claim 1, further comprising:

a controller configured to actuate the ply manipulator to secure an end of the ply and to rotate the disk and the arcuate track to move the ply to a specified position in the first translational dimension and the second translational dimension and the first rotational dimension and the second rotational dimension, the specified position defined by a set of coordinates in the first translational dimension and the second translational dimension and the first rotational dimension and the second rotational dimension.

10. The apparatus of claim 1, wherein the end effector defines an origin in a three-dimensional coordinate system and the first translational dimension and the second translational dimension define a first axis and a second axis of the three-dimensional coordinate system, the first axis being orthogonal to the second axis.

11. The apparatus of claim 10, wherein the end effector is movable along a third translational dimension defining a third axis of the three-dimensional coordinate system, the third axis being orthogonal to the first axis and the second axis.

12. The apparatus of claim 11, wherein the platform is movable along two of the first axis, the second axis, and the third axis of the three-dimensional coordinate system, and wherein the base is movable along a remaining one of the first axis, the second axis, and the third axis of the three-dimensional coordinate system.

13. A method for laying a ply of a composite material, the method comprising:

securing a first end of the ply with an end effector of a first robotic arm, the end effector movable in at least two translational dimensions and at least two rotational dimensions, the end effector comprising at least one arcuate track;

securing a second end of the ply with a second robotic arm;

translating and rotating the first end of the ply with the end effector to a specified position in the at least two translational dimensions and the at least two rotational dimensions; and moving the ply with the first robotic arm and the second robotic arm along a predetermined path onto a layup destination.

14. The method of claim 13, wherein the end effector includes a linear portion and rotatable portion, wherein translating the first end of the ply further comprises translating the first end of the ply in the at least two translational dimensions with the linear portion and rotating the first end of the ply in the at least two rotational dimensions with the rotatable portion.

15. The method of claim 14, further comprising actuating a linear actuator to translate the linear portion and actuating a rotational actuator to rotate the rotatable portion.

16. The method of claim 13, further comprising detecting a force between the first end of the ply and the end effector and determining the specified position to reduce the force detected below a force threshold.

17. The method of claim 16, further comprising determining the specified position to reduce the force detected to a specified force, the specified force being below the force threshold.

18. The method of claim 16, wherein detecting the force further comprises collecting force data from a force sensor.

19. The method of claim 13, further comprising translating and rotating the first end of the ply with the end effector to the specified position in three translational dimensions and three rotational dimensions, the specified position defined by a set of coordinates in the three translational dimensions and the three rotational dimensions.

20. An apparatus for controlling a ply of a composite material, the apparatus comprising:

a first robotic arm configured to control a position of a first location of the ply in multiple degrees of freedom, the multiple degrees of freedom including one or more translational degrees of freedom and one or more rotational degrees of freedom; and a second robotic arm configured to control a position of a second location of the ply in the multiple degrees of freedom, the first robotic arm and the second robotic arm configured to place the ply at a layup destination;

wherein the first robotic arm further comprises an end effector, the end effector comprising a translator configured to control the position of the first location of the ply in the one or more translational degrees of freedom and a rotator configured to control the position of the first location of the ply in the one or more rotational degrees of freedom, the rotator comprising at least one acuate track.

* * * * *